US012296205B2

(12) United States Patent
Ahlers et al.

(10) Patent No.: US 12,296,205 B2
(45) Date of Patent: May 13, 2025

(54) FIRE PROTECTION ELEMENT FOR SEALING PASSAGE OPENINGS IN COMPONENTS

(71) Applicant: Hilti Aktiengesellschaft, Schaan (LI)

(72) Inventors: Andreas Ahlers, Westendorf (DE); Sebastian Simon, Buchloe Lindenberg (DE); Ramona Prem, Untermeitingen (DE); Ralf Willner, Tussenhausen (DE); Sarah Freudling, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 731 days.

(21) Appl. No.: 17/287,597

(22) PCT Filed: Oct. 23, 2019

(86) PCT No.: PCT/EP2019/078786
§ 371 (c)(1),
(2) Date: Apr. 22, 2021

(87) PCT Pub. No.: WO2020/083954
PCT Pub. Date: Apr. 30, 2020

(65) Prior Publication Data
US 2021/0316177 A1 Oct. 14, 2021

(30) Foreign Application Priority Data

Oct. 24, 2018 (EP) .................................... 18202277

(51) Int. Cl.
*A62C 2/06* (2006.01)
*B32B 3/26* (2006.01)
(Continued)

(52) U.S. Cl.
CPC ............. *A62C 2/065* (2013.01); *B32B 3/266* (2013.01); *B32B 9/007* (2013.01); *B32B 9/041* (2013.01);
(Continued)

(58) Field of Classification Search
CPC ......... A62C 2/065; B32B 3/266; B32B 9/007; B32B 9/041; B32B 2264/108; B32B 2307/3065
(Continued)

(56) References Cited

U.S. PATENT DOCUMENTS 4,194,521 A * 3/1980 Banta .................. A62C 3/16
137/67
4,612,239 A * 9/1986 Dimanshteyn ....... A62D 1/0007
428/920
(Continued)

FOREIGN PATENT DOCUMENTS

| EP | 1 215 420 | | 6/2002 | |
|---|---|---|---|---|
| EP | 2942193 B1 | * | 10/2018 | ........... B32B 27/065 |
| WO | 2018/016580 | | 1/2018 | |

OTHER PUBLICATIONS

International Search Report issued Feb. 5, 2020 in PCT/EP2019/078786, with English translation, 5 pages.
(Continued)

*Primary Examiner* — Chee-Chong Lee
*Assistant Examiner* — Kevin Edward Schwartz
(74) *Attorney, Agent, or Firm* — Grüneberg and Myers PLLC

(57) ABSTRACT

A fire protection element containing a layered body can be utilized for sealing passage openings in components, such as building components, through which conduits are guided. A method can be used for producing the fire protection element. The fire protection element can be used for sealing passage openings and/or joints in components against fire and flue gases.

16 Claims, 8 Drawing Sheets

(51) Int. Cl.
    *B32B 9/00* (2006.01)
    *B32B 9/04* (2006.01)
(52) U.S. Cl.
    CPC . *B32B 2264/108* (2013.01); *B32B 2307/3065* (2013.01)
(58) Field of Classification Search
    USPC .......................................................... 169/48
    See application file for complete search history.

(56) References Cited

U.S. PATENT DOCUMENTS

| | | | | |
|---|---|---|---|---|
| 4,687,702 | A * | 8/1987 | Monsees | C08J 9/365 428/313.5 |
| 4,816,312 | A * | 3/1989 | Annemaier | C09K 21/14 523/179 |
| 5,498,466 | A | 3/1996 | Navarro et al. | |
| 5,607,787 | A * | 3/1997 | Wedlake | A62C 3/16 429/62 |
| 5,800,905 | A * | 9/1998 | Sheridan | F16L 59/08 156/251 |
| 6,862,852 | B1 * | 3/2005 | Beele | F16L 5/04 52/220.8 |
| 8,230,659 | B2 * | 7/2012 | Langille | E06B 5/161 52/213 |
| 9,097,011 | B1 * | 8/2015 | Barone | B05D 7/02 |
| 2004/0157012 | A1 * | 8/2004 | Miller | A62C 2/06 428/34.1 |
| 2005/0031843 | A1 * | 2/2005 | Robinson | B32B 33/00 428/921 |
| 2008/0063875 | A1 | 3/2008 | Robinson et al. | |
| 2011/0314755 | A1 | 12/2011 | Langille et al. | |
| 2013/0118764 | A1 * | 5/2013 | Porter | B32B 5/022 169/48 |
| 2014/0147615 | A1 * | 5/2014 | Fernando | B32B 5/24 428/688 |
| 2019/0226609 | A1 * | 7/2019 | Mantyla | F16L 5/04 |
| 2021/0353984 | A1 * | 11/2021 | Simon | E04B 1/948 |
| 2021/0394000 | A1 * | 12/2021 | Ahlers | E04B 1/947 |
| 2022/0111236 | A1 * | 4/2022 | Simon | E04B 1/947 |

OTHER PUBLICATIONS

Written Opinion Issued Feb. 5, 2020 in PCT/EP2019/078786, with English translation, 8 pages.
U.S. Appl. No. 17/287,573, filed Apr. 22, 2021, Simon et al.
U.S. Appl. No. 17/287,625, filed Apr. 22, 2021, Simon et al.
U.S. Appl. No. 17/287,641, filed Apr. 22, 2021, Ahlers et al.
International Search Report received for PCT Application No. PCT/EP2019/078787, mailed on Feb. 5, 2020, 5 pages with English translation.
U.S. Office Action received for U.S. Appl. No. 17/287,641, mailed on Apr. 25, 2024, 20 pages.
Written Opinion received for PCT Application No. PCT/EP2019/078787, mailed on Feb. 5, 2020, 8 pages with English translation.

* cited by examiner

FIRE PROTECTION ELEMENT FOR SEALING PASSAGE OPENINGS IN COMPONENTS

CROSS-REFERENCE TO RELATED APPLICATIONS

This application is the National Stage entry under § 371 of International Application No. PCT/EP2019/078786, filed on Oct. 23, 2019, and which claims the benefit of European Application No. 18202277.2, filed on Oct. 24, 2018. The content of each of these applications is hereby incorporated by reference in its entirety.

BACKGROUND OF THE INVENTION

Field of the Invention

The present invention relates to a fire protection element comprising a layered body for sealing passage openings in components, such as building components, through which conduits are guided. The present invention also relates to a method for producing the fire protection element according to the invention and to the use of the fire protection element for sealing passage openings and/or joints in components against fire and flue gases.

Description of Related Art

When installing conduits, such as pipelines, electrical cables and the like, they are guided through passage openings in components, in particular building components, such as walls and ceilings. In order to prevent the passage of fire and flue gases in the event of a fire, fire protection elements are introduced between the inner walls of the passage openings and the conduits guided therethrough, and into joints. These fire protection elements are usually provided with intumescent materials or formed from these, so that the material expands under the effect of heat, as occurs in the event of a fire, and thereby presses on the conduit and closes the passage opening in the component.

As a rule, the fire protection elements have a carrier material to which additives are added for the purposes of fire protection. These additives expand or intumesce at elevated temperatures, such as in the event of a fire, and form an insulating layer in combination with the carrier material and optionally further additives, thus closing any opening that may occur.

A physically acting blowing agent is often used in the known fire protection elements. This agent is usually randomly distributed on one or more areas of the surface of the carrier material and/or within the carrier material. The physically acting blowing agents often have a structural anisotropy, which means that they may for example exist in the form of flakes or fibers. This structural anisotropy is not taken into account in known fire protection elements, such that the physically acting blowing agent is randomly oriented or aligned on one or more areas of the surface and/or within the carrier material. The physically acting blowing agent thus shows no preferred orientation. In this case, one also speaks of an isotropic or statistical alignment or orientation of the physically acting blowing agent on one or more areas of the surface of the carrier material and/or within the carrier material.

Due to the random orientation of the physically acting blowing agent on one or more areas of the surface or within the carrier material, an expansion or intumescence of the physically acting blowing agent takes place substantially uniformly in all three spatial directions in the event of a fire. However, in fire protection elements which are used, for example, for sealing passage openings, an increased expansion in the direction of the passage opening to be closed is required. The expansion in all three spatial directions in known fire protection elements leads to a large part of the expanded material being pushed laterally out of the passage opening and thus only a small amount of pressure being exerted in the direction of the passage opening. In addition, the material pushed out of the passage opening is unprotected and therefore exposed to mechanical stresses, such as an extinguishing water jet, air currents caused by a fire or the like, such that the portion of the expanded material that is pushed out has no resistance in the event of a fire. Furthermore, the compression rate of the conduits guided through is reduced by the material being pushed laterally out through the passage opening such that, in the event of a fire, a short closure time is not guaranteed.

When the expansion of the physically acting blowing agent is now considered on a microscopic level in one spatial direction, this expansion is in each case "upward" and "downward". The simplified consideration of the expansion in one spatial direction already shows that opposing forces ("upward" and "downward") lead to mutual hindrance of the physically acting blowing agent during the expansion. The greater the structural anisotropy of the physically acting blowing agent, the more pronounced this effect becomes, as is the case for example in layered, physically acting blowing agents. This leads to a phenomenon known as "negative intumescence", which describes the loss of theoretically existing expansion or intumescent potential caused by the mutual hindrance of the physically acting blowing agent during expansion.

The above-described problems mean that the existing expansion or intumescence potential of the physically acting blowing agent can be utilized only to an extent.

In existing fire protection elements, attempts are made to prevent the problem of the expanded material being pushed laterally out by appropriately shaping the housing of the fire protection element or by the use of woven fabric which surrounds the expanded material.

For instance, EP 3 260 678 A1 describes a strip-shaped fire protection element in which an inner layer of intumescent material is provided with a reinforcing material over at least part of its width, such that bending in the region of the reinforcing insert forms a fold-over edge which surrounds the reinforcing insert on the outside.

DE 2004 055 928 B4 describes a fire protection sleeve in which a transport device is provided which displaces material expanding under the effect of heat in the event of a fire from a support device towards the interior of the guide.

In another approach, the geometry of the fire protection elements is designed such that an improved heat input is achieved, as a result of which an earlier expansion of the intumescent material takes place. Corresponding fire protection elements are described for example in EP 1 273 841 A1, DE 10 2008 031 018 A1 and DE 20 2012 003 405 U1.

In the prior art, no solutions are currently known with which the problems occurring due to the so-called "negative intumescence" can be eliminated.

Although with the known fire protection elements it is possible to reduce the lateral pushing-out of the expanded material, this cannot be prevented, and therefore this still results in a loss of material, which is not available for the closure of the passage opening. In addition, the expanded material being pushed laterally out leads to transverse compression of the expanded material, thereby hindering the expansion of the physically acting blowing agent to the passage center in order to close the passage. Furthermore, in these fire protection elements, compression of the physically acting blowing agent occurs by compression at the walls or the woven-fabric areas of the fire protection element. These compressed regions have a reduced expansion potential, which is no longer available for closing the passage in the event of a fire. Furthermore, the compression causes an increase in the thermal conductivity, as a result of which there is a more rapid increase in temperature on the side facing away from the fire, which is associated with an increased risk of fire penetration.

The disadvantages described above are especially relevant for fire protection elements for larger opening cross sections. In these fire protection elements, large amounts of physically acting blowing agents are used to ensure a reliable closure of the passage opening in the event of a fire. The problems described above are therefore to be observed here to a greater extent. In addition, these fire protection elements sometimes have a high weight, as a result of which their installation is difficult. Additionally, the use of large amounts of physically acting blowing agents is disadvantageous from both an ecological and economical point of view.

SUMMARY OF THE INVENTION

There is therefore a need for fire protection elements by means of which a gap between an inner surface of a passage opening and a conduit guided therethrough can be reliably sealed in the event of a fire and which ensures that the physically acting blowing agent is pushed out of the gap to a lesser extent when it expands, and also that compression of the physically acting blowing agent during expansion occurs to a reduced extent or is largely prevented, and consequently the conduit guided through is pressed on to a greater extent.

In addition, an object of the present invention is to provide a fire protection element which makes it possible to reduce the amount of material used, in particular the amount of physically acting blowing agent, without the performance of the fire protection element, in particular with regard to its closure ability in the event of a fire, being compromised. It is in particular an object of the present invention to provide a fire protection element by means of which a reduction in the amount of physically acting blowing agent in the fire protection element is made possible and by means of which, at the same time, improved performance of the fire protection element, in particular with regard to its closure ability in the event of a fire, can be achieved.

The object is achieved by a fire protection element and by a method, as described below.

Further embodiments are also included in the description below.

Figure 1:
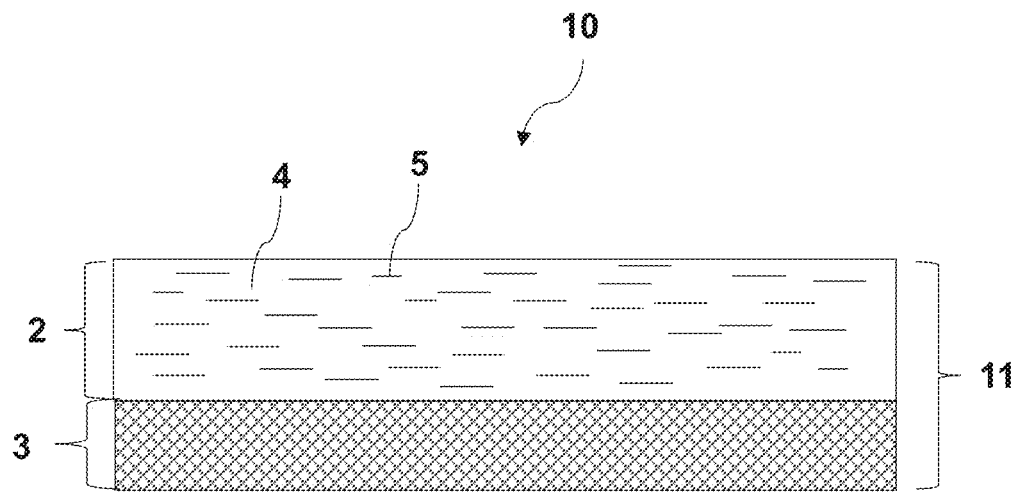
FIG. 1 shows a cross section of a preferred embodiment of a fire protection element according to the invention.

According to a first aspect of the present invention, a fire protection element (10) is provided comprising at least one fire protection layer (2) and at least one functional layer (3),
i) the fire protection layer (2) comprising a carrier material (4) and a large number of particles of at least one layered, physically acting blowing agent (5) and
ii) the functional layer (3) having a temperature resistance up to at least 300° C.,
characterized in that the fire protection layer (2) and the functional layer (3) are substantially firmly bonded to one another and in that adjacent particles of the layered, physically acting blowing agent are arranged substantially in parallel with one another over the entire fire protection layer (2), and the functional layer (3) comprises at least one semi-rigid material.

One concept of the above fire protection element is to provide an at least two-layer layered body having at least one fire protection layer and at least one functional layer. In the fire protection layer, a structurally anisotropic, physically intumescent material (layered, physically acting blowing agent) is combined with a carrier material and the structural anisotropy of the physically intumescent material is used, by alignment or orientation of the particles, in order to thus influence the direction of expansion in the event of a fire and to thus be able to control this in a targeted manner. The use of a semi-rigid material as a functional layer makes it possible to counteract compression of the layered, physically acting blowing agent in the course of the expansion by transferring the inflation pressure emanating from the fire protection layer to the functional layer.

For a better understanding of the invention, the following explanations of the terminology used herein are considered useful. In the context of the invention:

the term "carrier material" describes a composition comprising one or more polymers. The carrier material is characterized in that the polymer or polymers form a continuous phase;

the term "firmly bonded" describes a bond between two layers which results from molecular forces and holds the layers together in such a way that they form a solid body in their entirety. A firm bond can be produced for example by welding, soldering or gluing. The separation of a firm bond is often possible only by destroying the elements that were connected to one other by a firm bond.

the term "form-fitting" describes a connection between two materials which results from at least two connecting parts interlocking. In the context of the present invention, a form-fit connection can be produced in particular by the plastic deformability of the polymeric carrier material being used to bring about interlocking.

"physical intumescence" means the formation of a voluminous, insulating layer by means of expansion of a compound that releases gases under the effect of heat, without a chemical reaction between two compounds having taken place, thereby causing the volume of the compound to increase by a multiple of the original volume. In the context of the present invention, the term "physically acting blowing agent" means a material or a component which is capable of exhibiting physical intumescence when a certain temperature, the so-called activation temperature, is exceeded;

the term "thermal expansion" or simply "expansion" means the volume increase of a material or a component caused by physical and/or chemical intumescence;

a "polymer" is a molecule having six or more repetition units, which can have a structure that can be linear, branched, star-shaped, twisted, hyper-branched or crosslinked; polymers can have a single type of repetition unit ("homopolymers") or they can have more than one type of repetition unit ("copolymers");

the term "solids content" means the content of non-volatile proportions of a composition. The solids content is determined according to DIN EN ISO 3251 (2008);

"contain" and "comprise" mean that further constituents may be present in addition to those mentioned. These terms are intended to be inclusive and therefore also encompass the term "consist of". "Consist of" is intended to be exclusive and means that no further constituents may be present. In a preferred embodiment, the terms "contain" and "comprise" mean the term "consist of";

a range limited by numbers, e.g. "5 to 60 wt. %", means that the two extreme values and any value within this range are disclosed individually.

The fire protection element according to the present invention comprises at least one fire protection layer and at least one functional layer, wherein the fire protection layer and the functional layer are substantially firmly bonded to one another. The fire protection element of the present invention thus comprises a layered body which has a two-layer structure in its simplest embodiment. However, it is also possible for the fire protection element to have further fire protection layers and/or functional layers. In this case, it is advantageous for the fire protection element to comprise a layered body having an alternating structure of fire protection layers and functional layers, i.e. for the layered body to be made up of a sequence of identical and/or different fire protection layers and identical and/or different functional layers, with the fire protection layers and functional layers adjacent to one another in each case advantageously being substantially firmly bonded to one another.

In a preferred embodiment, the fire protection element comprises a layered body having at least two fire protection layers and at least one functional layer arranged between the fire protection layers, wherein, in order to form the layered body, the fire protection layers and the functional layer arranged between the fire protection layers are substantially firmly bonded to one another. However, it may also be necessary, such as in fire protection elements for larger opening cross-sections, that the fire protection element according to the present invention requires a higher-layered structure of a plurality of fire protection layers and a plurality of functional layers. In this case, it is advantageous that the number of fire protection layers is n and the number of functional layers is n−1, where n is an integer from 3 to 11.

The term "substantially firmly bonded" in the context of the present invention is to be understood as meaning that the materials of two adjacent layers (fire protection layer and functional layer) are firmly bonded to one another to a great extent. In some cases, the functional layer may have "holes" due to its geometry. The term "substantially firm bond" in these cases refers to the actual material from which the functional layer is formed, and the "holes" are disregarded. In addition, the surface condition of the functional layer can determine whether a planar firm bond, a spatial firm bond or mixtures thereof are achieved between the fire protection layer and the functional layer. In the case of a spatial firm bond, substantially the entire material surface of the functional layer is connected to the fire protection layer. In cases where the functional layer has a pronounced three-dimensional structure, it may be the case that only the highest- or lowest-lying material of the functional layer is firmly bonded to the fire protection layer, rather than the entire material surface of the functional layer. This is known as a planar firm bond. In order to be able to achieve the effect of the invention, a substantially planar firm bond is sufficient, but it is preferred for there to be a substantially spatial firm bond between the fire protection layer and the functional layer.

For production-related reasons, for example, in the case of smaller areas of two adjacent layers, it may not be possible for a planar or spatial firm bond to occur and the surfaces of the layers may merely rest on one another at these points. Corresponding layered bodies are also considered to be according to the invention and are suitable for use in the fire protection element according to the invention. Preferably, at least 40%, more preferably 60%, even more preferably 80% of the adjacent areas of the fire protection layer and the functional layer are firmly bonded to one another in a planar manner, in particular firmly bonded in a spatial manner, within the layered body. It has been found to be particularly advantageous if, within the layered body, at least 90%, more preferably at least 95% and particularly preferably 98% of all fire protection layers and functional layers adjacent to one another are firmly bonded to one another in a planar manner, in particular firmly bonded in a spatial manner.

Alternatively or additionally, the fire protection layer (2) and the functional layer (3) can also be interconnected substantially in a form-fitting manner in order to achieve the effect essential to the invention.

The at least one fire protection layer comprises a carrier material and a large number of particles of at least one layered, physically acting blowing agent. If the fire protection element according to the invention comprises more than one fire protection layer, then the carrier material of the fire protection layers can be the same or different. In a preferred embodiment, the fire protection layers comprise the same carrier material.

The carrier material preferably comprises a polymer dispersion based on water or solvent, in particular an aqueous polymer dispersion. Examples of aqueous polymer dispersions which have proven particularly useful are aqueous acrylate dispersions, aqueous dispersions or emulsions of urea resins, formaldehyde resins or melamine resins, polyvinyl acetates, polyvinyl alcohols, acrylonitrile, styrene acrylates and their copolymers.

The carrier material preferably comprises an aqueous acrylate (copolymer) dispersion, more preferably an aqueous dispersion of a polyalkyl (meth)acrylate and/or an alkyl (meth)acrylate copolymer. These are preferably aqueous dispersions which are obtained by polymerization, in particular by emulsion polymerization of alkyl (meth)acrylates and/or by copolymerization of alkyl (meth)acrylates with themselves and/or with copolymerizable comonomers, such as preferably (meth)acrylic acid, (meth)acrylamide, styrene, itaconic acid, acrylonitrile and/or citraconic acid, the alkyl groups of the alkyl (meth)acrylates preferably having 1 to 6 C atoms, more preferably 1 to 4 C atoms. Particularly preferred according to the invention are aqueous dispersions of polybutyl acrylate, polyethylhexyl acrylate or alkyl (meth)acrylate-styrene copolymers. The acrylate (copolymer) dispersion may contain both homopolymers and copolymers or mixtures of homopolymers and/or copolymers and, preferably with a pH in the range of from 7 to 9, preferably a pH of 8, which is adjusted if necessary with dilute sodium hydroxide solution or ammonia solution, is mixed with the other constituents. This aqueous acrylate (copolymer) dispersion preferably has a solids content of from 40 to 90 wt. %, more preferably 50 to 80 wt. %. The acrylate (copolymer) dispersions preferably used according to the invention are known to a person skilled in the art and are commercially available. The curing takes place physically by drying.

It is further preferred for the carrier material to have a softening or decomposition point in the temperature range of from 80° C. to 500° C., preferably from 90° C. to 400° C., more preferably from 110° C. to 300° C. By appropriately selecting the softening or decomposition temperature of the carrier material, the expansion properties of the fire protection element according to the invention can be influenced. If premature softening or decomposition of the carrier material occurs in the event of a fire, this may possibly lead to a reorientation of the layered, physically acting blowing agent by deformation and/or melting of the carrier material. If the softening or decomposition temperature of the carrier material is too high, the expansion of the layered, physically acting blowing agent is hindered. Furthermore, by appropriately selecting the softening or decomposition temperature of the carrier material of the fire protection layers, it is possible to influence the interaction between the functional layer and the layered, physically acting blowing agent.

According to the invention, the fire protection layer comprises at least one layered, physically acting blowing agent.

If the fire protection element according to the invention comprises more than one fire protection layer, then the layered, physically acting blowing agent of the fire protection layers can be the same or different. In a preferred embodiment, the fire protection layers comprise the same layered, physically acting blowing agent.

In the context of the present invention, the term "layered" is understood to mean a material which is structurally anisotropic in the form of layers. The layered structure is due to the fact that the interactions within a layer are much more pronounced than between the layers. In the context of the present invention, this means in particular that covalent bonds are present within the layers, with only weak interaction in the form of electrostatic and/or van der Waals forces acting between the layers.

The layered, physically acting blowing agent comprises a plurality of particles. It is essential to the invention that adjacent particles of the layered, physically acting blowing agent are arranged substantially in parallel with one another over the entire fire protection layer. Preferably, the particles of the layered, physically acting blowing agent are in the form of flakes, the adjacent flakes being arranged substantially in parallel with one another over the entire fire protection layer.

It is essential to the present invention that adjacent particles of the layered, physically acting blowing agent are arranged substantially in parallel with one another over the entire fire protection layer. In the event of a fire, the layered, physically acting blowing agent expands substantially perpendicularly to its layers from which it is constructed. A substantially parallel alignment of adjacent particles over the entire fire protection layer ensures that the expansion takes place substantially in one spatial direction. The substantially parallel alignment of the particles thus allows spatial control of the expansion behavior in the event of a fire. When using the fire protection element according to the invention, it is thus possible to increasingly control the expansion in the direction of the passage opening to be closed and thus to reduce or prevent lateral pushing out from the passage opening. The layered, physically acting blowing agent used is available to a great extent for the closure of the passage opening such that the closure ability is improved overall, which is also associated with a significant reduction in the use of material with respect to the layered, physically acting blowing agent.

The term "over the entire fire protection layer" in the context of the present invention is understood to mean that, when considering the orientation of adjacent particles of the layered, physically acting blowing agent, an overall consideration of the fire protection layer is necessary and the substantially parallel orientation of adjacent particles has to be present substantially for the entire volume of the fire protection layer in order to lead to the essential effect according to the invention. A local, random parallel arrangement of adjacent particles in parts of the fire protection layer does not lead to the effect essential to the invention of a directed expansion within the meaning of the invention. However, due to the fact that the orientation is considered at the level of the individual particles and their adjacent particles, it is not absolutely necessary for all of the particles of the layered, physically acting blowing agent to have a substantially parallel alignment in the fire protection layer. If, for example, there is a bending of the fire protection layer during application, the adjacent particles of the layered, physically acting blowing agent are arranged substantially in parallel, but not all particles are arranged substantially in parallel with one another due to the bending of the fire protection layer.

The term "substantially in parallel" in the context of the present invention is understood to mean that the adjacent particles do not have to satisfy the strictly mathematical requirements of parallel planes, but rather slight tilting of the planes is also permitted.

Even with slight tilting of the planes, the above-described effect of an expansion occurring substantially in one spatial direction is still ensured. Furthermore, the term "substantially in parallel" in the context of the present invention also includes a situation whereby a small proportion of adjacent particles need not be arranged in parallel, which may be for production-related reasons, for example. Preferably, at least 75%, more preferably at least 80%, more preferably at least 85%, more preferably at least 90%, more preferably at least 95% of the adjacent particles of the layered, physically acting blowing agent show a parallel arrangement with respect to one another.

The substantially parallel arrangement of the adjacent particles of the layered, physically acting blowing agent over the entire fire protection layer can be determined by visual inspection of the fire protection layer by a person skilled in the art, optionally with the aid of a microscope.

A quantification of any tilting that may be present can theoretically be described by a perpendicular (90°) being let fall on an arbitrarily selected particle of the layered, physically acting blowing agent. Upon displacement of this perpendicular with respect to particles adjacent to this particle, there is preferably a maximum angular deviation from 90° of 25°, more preferably 15°, more preferably 10°, more preferably 5° and even more preferably 2°.

The term "adjacent particles" in the context of the present invention is understood to mean those particles which are in close proximity to a particular particle in all three spatial directions, i.e. which are arranged within a first sphere around a particle. Preferably, the term "adjacent particles" does not only mean the directly adjacent particles, but also those particles which in turn are directly adjacent to the directly adjacent particles of a particle, i.e. particles which go beyond the first sphere and are arranged around a particle within a second sphere.

In order to form a fire protection layer, adjacent particles of the layered, physically acting blowing agent are arranged substantially in parallel with one another over the entire fire protection layer. It follows that, within a fire protection layer, all particles of the layered, physically acting blowing agent can be arranged substantially in parallel with one other. This constitutes a preferred embodiment of the present invention.

However, a substantially parallel alignment of all particles of the layered, physically acting blowing agent within a fire protection layer is not absolutely necessary in order to achieve the effect essential to the invention of a targeted expansion in substantially one spatial direction. This is for example the case when the fire protection element according to the invention is in the form of a long bandage which is coiled, for example, around a conduit guide which passes through a passage opening. In this case, the adjacent particles of the layered, physically acting blowing agent are arranged substantially in parallel over the entire fire protection layer, but not all particles are arranged substantially in parallel with one another due to the coiling and the associated bending of the bandage. If the adjacent particles are arranged in this case in the longitudinal direction of the bandage substantially in parallel with one another over the entire fire protection layer, the expansion in the event of a fire takes place substantially in the direction of the center of the passage opening.

To form a fire protection layer, the layered, physically acting blowing agent can be embedded within the carrier material and/or applied to one or more areas of the surface of the carrier material.

In a preferred embodiment, the layered, physically acting blowing agent is embedded within the carrier material. Preferably, the layered, physically acting blowing agent is distributed substantially uniformly within the carrier material. However, it is also possible for the concentration of the layered, physically acting blowing agent in the carrier material to vary. For instance, the concentration of the layered, physically acting blowing agent may also be varied in a punctiform, pattern-like, planar and/or sandwich-like manner. A variable concentration has the advantage that increased expansion can be achieved at particular points of the fire protection element in a targeted manner.

In a further preferred embodiment, the layered, physically acting blowing agent is applied to one or more areas of the surface of the carrier material, in particular at least to the area facing the functional layer.

In a further preferred embodiment, the layered, physically acting blowing agent is both embedded within the carrier material and applied to one or more areas of the surface of the carrier material.

Depending on the application, the layered, physically acting blowing agent can be present in the fire protection layer in a very broad weight percent range. However, it is preferred for the layered, physically acting blowing agent to be contained in the relevant fire protection layer in an amount of from 10 to 90 wt. %, preferably from 15 to 70 wt. %, more preferably from 20 to 55 wt. % based on the sum of the solids content of the carrier material and the layered, physically acting blowing agent.

Preferably, the amount of the layered, physically acting blowing agent is from 8 to 70 wt. %, preferably from 12 to 55 wt. % and in particular from 15 to 40 wt. % based on the total weight of the fire protection element.

The average particle size of the layered, physically acting blowing agent can be within a broad range depending on the application. Preferably, the layered, physically acting blowing agent has an average particle size of from 50 µm to 4.0 mm, preferably from 80 µm to 3.5 mm and particularly preferably from 100 µm to 3.0 mm. The average particle size can be determined by the methods known to a person skilled in the art, for example by means of sieving analysis according to DIN 66165 (2016).

The layered, physically acting blowing agent is preferably selected from the group consisting of graphite intercalation compounds (also known as expandable graphite) phyllosilicate intercalation compounds and combinations thereof, with graphite intercalation compounds or expandable vermiculite being preferred.

Known intercalation compounds of $SO_x$, NOx, halogen, acetic acid, nitric acid and/or strong acids in graphite can be considered as examples of graphite intercalation compounds. These are also referred to as graphite salts. Graphite intercalation compounds that give off $SO_2$, $SO_3$, NO and/or $NO_2$ while expanding at temperatures (activation temperatures) of from 120 to 350° C., for example, are preferred. Expandable graphites suitable for the present invention are commercially available.

Preferably, the graphite intercalation compounds have an average particle size of from 50 µm to 1.0 mm, preferably from 70 µm to 0.7 mm and particularly preferably from 90 µm to 0.5 mm.

Suitable phyllosilicate intercalation compounds (expandable phyllosilicates) are, for example, those compounds which can be obtained by incorporation of intercalation compounds into native, expandable phyllosilicates, in particular native vermiculite. Representatives of the alcoholates of lithium and potassium and salts of lithium, sodium and potassium with organic acids and/or aqueous solutions thereof, which are incorporated into the native phyllosilicate by cation exchange, are preferred as the intercalation compound. In this regard, reference is made to DE 1029083 A1 and the literature cited therein, e.g. EP 0 429 246 A1, the contents of which are hereby incorporated into this application.

The phyllosilicate intercalation compounds preferably have an average particle size of from 100 µm to 4.0 mm, preferably from 120 µm to 3.5 mm and particularly preferably from 150 µm to 3.0 mm.

If the fire protection element comprises more than one fire protection layer, in a preferred embodiment all the fire protection layers comprise the same or different graphite intercalation compounds, in particular all the fire protection layers comprise the same graphite intercalation compound.

The carrier material may further comprise at least one organic and/or inorganic fiber which is selected in particular from the group consisting of glass fiber, ceramic fiber, carbon fiber, polyamide fiber, metal fiber, boron fiber, natural fiber, rock fiber and mixtures thereof. The presence of an organic and/or inorganic fiber in the carrier material facilitates the incorporation and orientation of the layered, physically acting blowing agent into the carrier material. Particularly suitable fibers are glass fibers and/or metal fibers, in particular made of E-glass, silicate fibers or mineral wool fibers.

The organic or inorganic fibers preferably have a length of from 1 mm to 25 mm, more preferably from 2 mm to 20 mm, and particularly preferably from 3 mm to 15 mm. By way of example, glass fibers from STW can be mentioned here.

The organic or inorganic fibers are preferably contained in the relevant fire protection layer in an amount of from 0.1 to 25.0 wt. %, preferably from 0.5 to 15.0 wt. %, particularly preferably from 1.0 to 6.0 wt. % based on the sum of the solids content of the carrier material and the layered, physically acting blowing agent.

It is particularly preferred for the longitudinal extent of the organic and/or inorganic fiber to be substantially parallel to the particles of the layered, physically acting blowing agent. In this case, the organic and/or inorganic fibers support the effect of the expansion being targeted in one spatial direction in the event of a fire.

Because the ash crust formed in the event of a fire may be too unstable and, depending on its density and structure, may therefore be blown away by air streams, which has a negative effect on the sealing effect of the fire protection element, the carrier material may additionally contain at least one ash crust stabilizer.

An "ash crust stabilizer" is a so-called skeleton-forming compound which stabilizes the carbon skeleton (ash crust) formed from the physically acting blowing agent and the carrier material. In this connection, the fundamental mode of action is that the inherently very soft carbon layers being formed are mechanically strengthened by inorganic compounds. The addition of such an ash crust stabilizer contributes to significant stabilization of the intumescence crust in the event of a fire, because these additives increase the mechanical strength of the intumescent layer and/or prevent it from falling off, as a result of which the insulating effect is maintained or enhanced.

The compounds commonly used in fire protection formulations and known to a person skilled in the art, for example particulate metals, such as aluminum, magnesium, iron and zinc, may be considered as ash crust stabilizers or skeleton formers. The particulate metal can be present in the form of a powder, flakes, scales, fibers, threads and/or whiskers, the particulate metal in the form of powder, flakes or scales having a particle size of ≤50 μm, preferably of from 0.5 to 10 μm. If the particulate metal is used in the form of fibers, threads and/or whiskers, a thickness of from 0.5 to 10 μm and a length of from 10 to 50 μm are preferred. Alternatively or additionally, an oxide or a compound of a metal of the group comprising aluminum, magnesium, iron or zinc may be used as the ash crust stabilizer, in particular iron oxide, preferably iron trioxide, titanium dioxide, and/or a borate such as zinc borate. Examples of such additives are also found in U.S. Pat. No. 4,442,157 A, 3,562,197 A, GB 755 551 A, as well as EP 138 546 A1.

Preferably, the ash crust stabilizer is a phosphorus-containing compound selected from salts and derivatives of the oxoacids of phosphorus. The oxoacids of phosphorus are used because their range is very large. The oxoacids of phosphorus are phosphoric acid ($H_3PO_4$) (also referred to as orthophosphoric acid), diphosphoric acid ($H_4P_2O_7$) (also referred to as pyrophosphoric acid), triphosphoric acid ($H_5P_3O_{10}$), polyphosphoric acid ($H_{n+2}P_nO_{3n+1}$), polymetaphosphoric acid (($HPO_3)_n$), hypophosphoric acid ($H_4P_2O_6$) (also diphosphoric (IV) acid), diphosphoric (III, V) acid ($H_4P_2O_6$), phosphonic acid ($H_3PO_2(2)$), where the number in the parenthesis designates the maximum base of the acid, if this is different from the total number of H atoms in the formula, (also referred to as phosphorous acid), diphosphonic acid ($H_4P_2O_5(2)$), where the number in the parenthesis designates the maximum base of the acid, if this is different from the total number of H atoms in the formula (also referred to as diphosphorous acid), phosphinic acid ($H_3PO_2(1)$), where the number in the parenthesis designates the maximum base of the acid, if this is different from the total number of H atoms in the formula.

The following may be mentioned by way of example as phosphoric acid compounds: monoammonium phosphate, diammonium phosphate, ammonium phosphate, ammonium polyphosphate, melamine phosphate, melamine polyphosphates, melamine resin phosphates, potassium phosphate, polyol phosphates such as, for example, pentaerythritol phosphate, glycerol phosphate, sorbitol phosphate, mannitol phosphate, dulcitol phosphate, neopentyl glycol phosphate, ethylene glycol phosphate, dipentaerythritol phosphate and the like. Preferably, a polyphosphate or an ammonium polyphosphate is used as a phosphoric acid compound. In this regard, melamine resin phosphates are understood to be compounds such as the reaction products of Lamelite C (melamine-formaldehyde resin) with phosphoric acid.

The ash crust stabilizer is preferably present in an amount of from approximately 5 to 35 wt. %, preferably 7 to 30 wt. %, particularly preferably 10 to 28 wt. %, in the relevant fire protection layer, based on the sum of the solids content of the carrier material and the layered, physically acting blowing agent.

In addition, other fire protection additives, in particular those which cause chemical intumescence, and those which act ablatively, may be contained in the composition. "Chemical intumescence" means the formation of a voluminous, insulating ash layer by means of compounds which are coordinated with one another and which react with one another under the effect of heat. These are generally a carbon source, an acid former and a gas former.

A "carbon source" is an organic compound which, due to incomplete combustion, leaves behind a carbon skeleton and is combusted incompletely to form carbon dioxide and water (carbonization). These compounds are also known as "carbon-skeleton formers". An "acid former" is a compound which, under the effect of heat, i.e. above approximately 150° C., forms a non-volatile acid, for example due to decomposition, and thereby acts as a catalyst for carbonization. In addition, it can contribute to lowering the viscosity of the melt of the carrier material. The term "dehydrogenation catalyst" is used synonymously here. A "gas former" is a compound which decomposes at an elevated temperature with the development of inert, i.e. non-combustible, gases and expands the carbon skeleton formed by the carbonization and optionally the softened binder into a foam (intumescence).

Optionally, the carrier material may contain other conventional additives, such as plasticizers, fillers, pigments, additives for adjusting the rheological properties, thickeners, dispersants, emulsifiers, biocides, fungicides, preservatives and anti-aging agents, antifreeze agents, wetting agents, defoamers and/or skin-formation retardants. These other additives are commercially available products known to a person skilled in the art.

Fillers which can be used are the fillers commonly used and known to a person skilled in the art. The following can be mentioned by way of example as fillers: chalk, barium sulfate, quartz, talc, kaolin, calcium sulfate and/or calcium silicate. The filler may be used alone or as a mixture of two or more.

As pigments, the carrier material may preferably contain iron oxide, titanium dioxide, zinc sulfide, zinc oxide and/or organic or inorganic color pigments.

The additives may be present in an amount of from approximately 0.25 to 2.5 wt. %, preferably 0.5 to 1.7 wt. %, particularly preferably 0.8 to 1.6 wt. % in the relevant fire protection layer, based on the sum of the solids content of the carrier material and the layered, physically acting blowing agent.

The fire protection layer preferably has an average maximum layer thickness of ≤10 mm, more preferably ≤8 mm, and particularly preferably ≤5 mm. In a preferred embodiment, the fire protection layer has an average layer thickness of from 0.5 mm to 4.6 mm. If the fire protection element according to the invention comprises two or more fire protection layers, these fire protection layers can have the same or different average layer thicknesses. It is preferred for the fire protection layers of the fire protection element to have approximately the same average layer thicknesses.

The functional layer according to the invention has a temperature resistance up to at least 300° C. Preferably, the functional layer has a temperature resistance up to at least 400° C., more preferably up to at least 450° C., even more preferably up to at least 500° C., and most preferably up to at least 550° C. In the context of the present invention, the term temperature resistance means the resistance of the functional layer to high temperatures. When the temperature resistance is exceeded, the temperature-dependent properties change so significantly that the material no longer meets the requirements or is destroyed. In the context of the present invention, temperature resistance means in particular that, up to the specified temperature limit, no decomposition, melting or burning or other serious change in the material properties takes place which results in the mode of action of the functional layer being lost.

The functional layer preferably extends continuously along the fire protection layer or, in the presence of two or more fire protection layers, continuously between the fire protection layers. In the context of the present invention, this means that the functional layer is not interrupted.

It is essential to the invention that the functional layer comprises at least one semi-rigid material or preferably consists of at least one semi-rigid material.

In the context of the present invention, the term "semi-rigid material" is understood to mean a material which has both sufficient mechanical strength to be able to absorb the inflation pressure emanating from the fire protection layer and sufficient flexibility such that the expansion of the physically acting blowing agent is not hindered.

Preferably, the semi-rigid material is selected from the group consisting of fiber composite materials, metals, metal alloys and combinations thereof.

In one embodiment of the invention, the functional layer comprises a fiber composite material. The fiber composite material may comprise a technical fiber from the group consisting of glass fiber, ceramic fiber, carbon fiber, polyamide fiber, metal fiber, boron fiber, natural fiber, rock fiber and mixtures thereof. It is advantageous for the fiber composite material to be composed of mono- and/or continuous filaments, resulting in a stable continuous thread. These continuous threads are preferably bonded together so as to have a high tensile strength.

In another embodiment of the invention, the functional layer is formed from one or more metals and/or one or more metal alloys, in particular aluminum and/or iron.

The functional layer is preferably formed from a structure that is continuous in at least two dimensions. It is preferred for the functional layer to be formed as a film, as a perforated plate, as a mat, as a grid or as a woven fabric.

It has proven advantageous for the semi-rigid material to be selected from the group consisting of expanded metal, glass fiber material, aluminum foil and combinations thereof.

Preferably, the semi-rigid material comprises a glass fiber material, in particular a glass fiber non-woven fabric, a glass fiber laid scrim, a glass fiber knitted fabric, a glass fiber woven fabric or combinations thereof. In order to achieve a sufficient temperature stability in glass fiber materials that have no direct interweaving, such as a glass fiber non-woven fabric or glass fiber knitted fabrics, the individual threads have be fixed to one other by means of an adhesive which has a sufficient temperature stability. Epoxy-based adhesives which preferably have a temperature stability of at least 180° C., more preferably at least 205° C., and in particular at least 220° C., are suitable for this purpose, for example. The glass fiber material preferably has a weight per unit area in the range of from 50 to 1500 $g/m^2$, preferably in the range of from 100 to 1300 $g/m^2$, more preferably 150 $g/m^2$ to 900 $g/m^2$ and in particular in the range of from 180 to 700 $g/m^2$. It is preferred for the glass fiber material to be a glass material reinforced with steel fibers, in particular a glass fiber woven fabric reinforced with steel fibers. Corresponding glass fiber woven fabrics reinforced with steel fibers are available, for example, from HKO.

In a particularly preferred embodiment, the semi-rigid material is a glass fiber woven fabric and the functional layer consists thereof; in particular, the glass fiber woven fabric has a weight per unit area of from 180 to 700 $g/m^2$.

Alternatively, the semi-rigid material preferably comprises at least one expanded metal. The expanded metal preferably has an average mesh size of ≤15 mm×10 mm, preferably ≤12 mm×9 mm and in particular ≤10.5 mm×7 mm, the lower limit of the average mesh size being ≤1.5 mm×0.6 in each case. In a particularly preferred embodiment, the semi-rigid material is an expanded metal and the functional layer consists thereof; in particular, the expanded metal has an average mesh size of from 6 mm×3.4 mm to 2.5 mm×1.7 mm.

The average layer thickness of the functional layer may in principle be less than, equal to or greater than the average layer thickness of the fire protection layer. Expediently, the ratio of the average layer thickness of a fire protection layer to the average layer thickness of a functional layer in the fire protection element is from 1:3 to 10:1. If the functional layer is very thin, for example ≤50 μm, the ratio may also deviate from the aforementioned range. Here, the ratio of the average layer thickness of the fire protection layer to the average layer thickness of the functional layer in the fire protection element is preferably from 1:1 to 50:1. The functional layer preferably has a maximum layer thickness of ≤5 mm, more preferably ≤2.5 mm, and particularly preferably ≤1 mm. In a preferred embodiment, the functional layer has a layer thickness of from 8 μm to 1.5 mm.

If the fire protection element according to the invention comprises more than one functional layer, then the functional layers can be structured identically or differently. In this case, however, it is advantageous for the functional layers present to be structured as identically as possible. The two or more functional layers can have the same or different average layer thicknesses. However, it is preferred for the functional layers to have approximately the same average layer thicknesses.

Optionally, one or more fire protection layers and/or one or more functional layers may additionally comprise one or more intermediate layers (6). An adhesive layer which is used to produce at least a partially firm bond between the fire protection layer and the functional layer is considered as an intermediate layer, for example. The materials commonly used and known in the art are considered for the production of the adhesive layer. These include, for example, the materials listed in document EP1161348 A1, the contents of which are hereby incorporated into the present application.

The intermediate layer preferably has an average maximum layer thickness of ≤0.1 mm, more preferably ≤0.05 mm, and particularly preferably ≤0.025 mm. In a preferred embodiment, the intermediate layer has a layer thickness of from 5 µm to 0.025 mm. If the fire protection element according to the invention comprises two or more intermediate layers, these intermediate layers can have the same or different average layer thicknesses. It is preferred that the intermediate layers of the fire protection element have approximately the same average layer thicknesses.

But it is also possible to produce a substantially firm bond without the use of an adhesive layer. In this preferred embodiment, the functional layer is placed and/or pressed into the not-yet dried carrier material of the fire protection layer and then the carrier material is cured by physical drying.

For the formation of the fire protection element according to the present invention, theoretically a large number of fire protection layers and functional layers can be combined with one another. However, it is expedient that the fire protection element according to the invention overall has a maximum of 22 layers.

The fire protection element according to the invention can be configured in all forms that geometrically allow the use as a fire protection element. In a preferred embodiment, the fire protection element is strip-shaped and is in the form of an endless bandage.

DESCRIPTION OF THE DRAWINGS

Embodiments will be explained in more detail with reference to the accompanying drawings.

Figure 2:
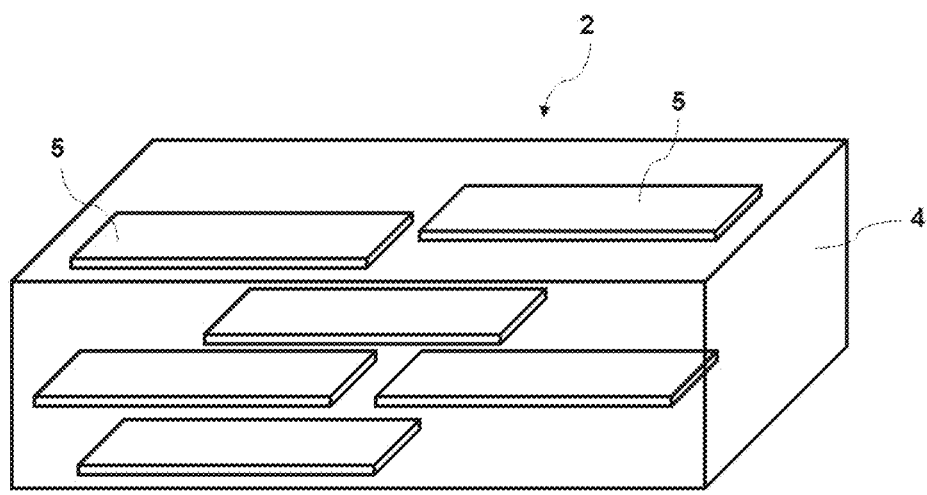
FIG. 2 shows a schematical three-dimensional representation of a fire protection layer (2) from FIG. 1.
Figure 3:
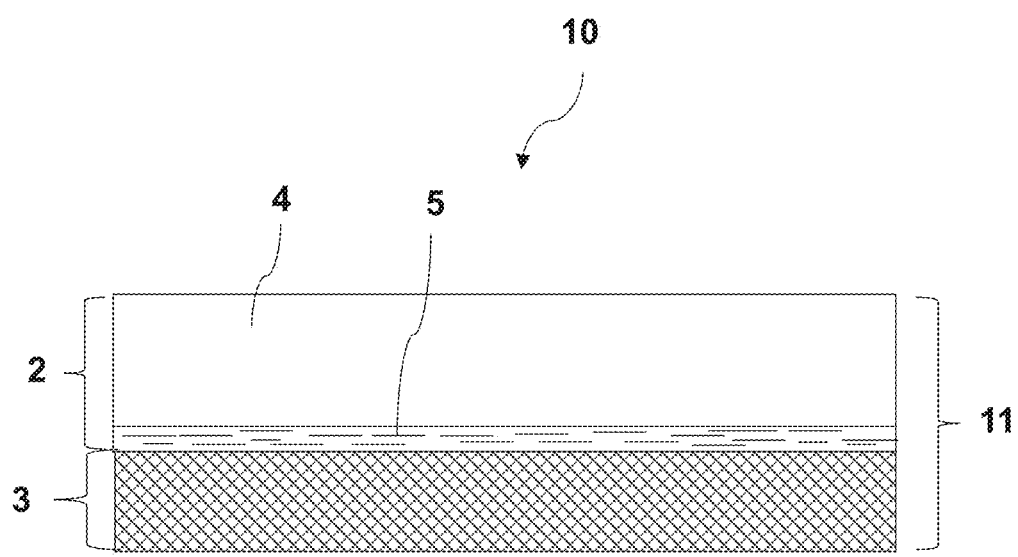
FIG. 3 shows a cross section of an alternatively preferred embodiment of a fire protection element according to the invention.
Figure 4A:
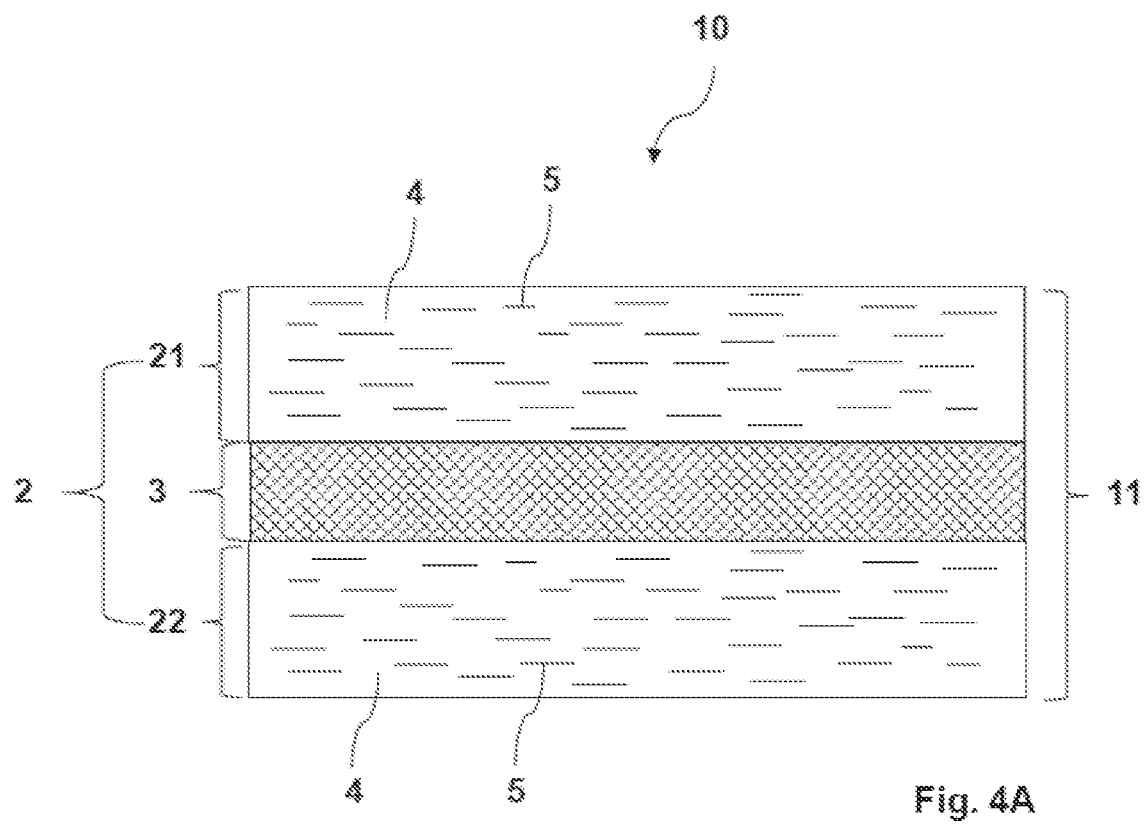
FIG. 4A shows a first preferred embodiment of a fire protection element according to the invention with a three-layer structure.
Figure 4B:
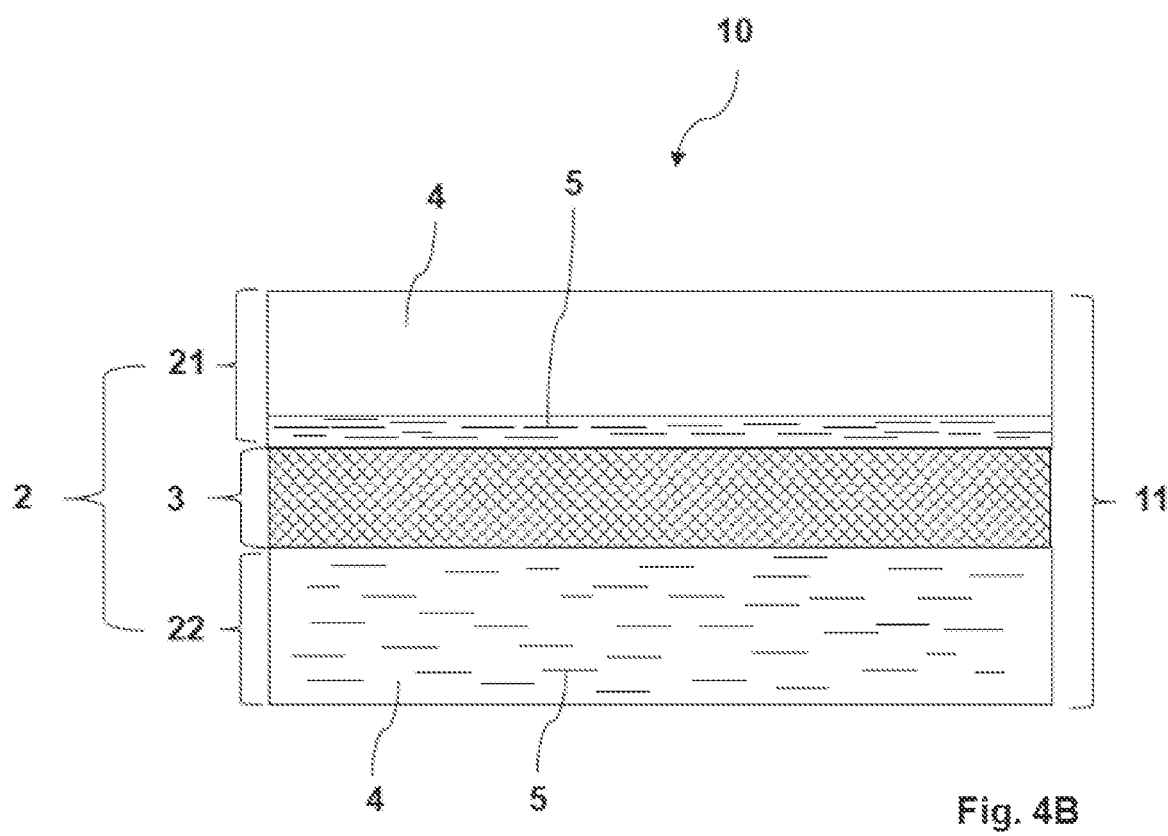
FIG. 4B shows a second preferred embodiment of a fire protection element according to the invention with a three-layer structure.
Figure 4C:
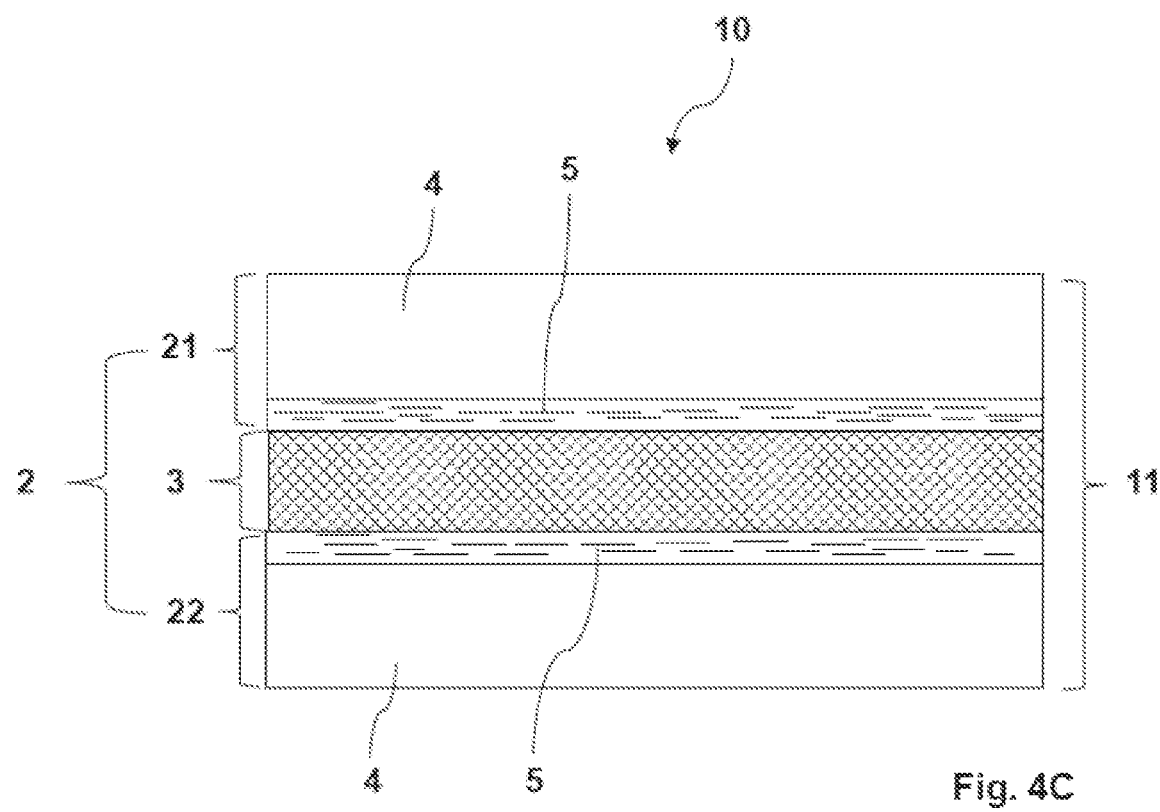
FIG. 4C shows a third preferred embodiment of a fire protection element according to the invention with a three-layer structure.
Figure 5:
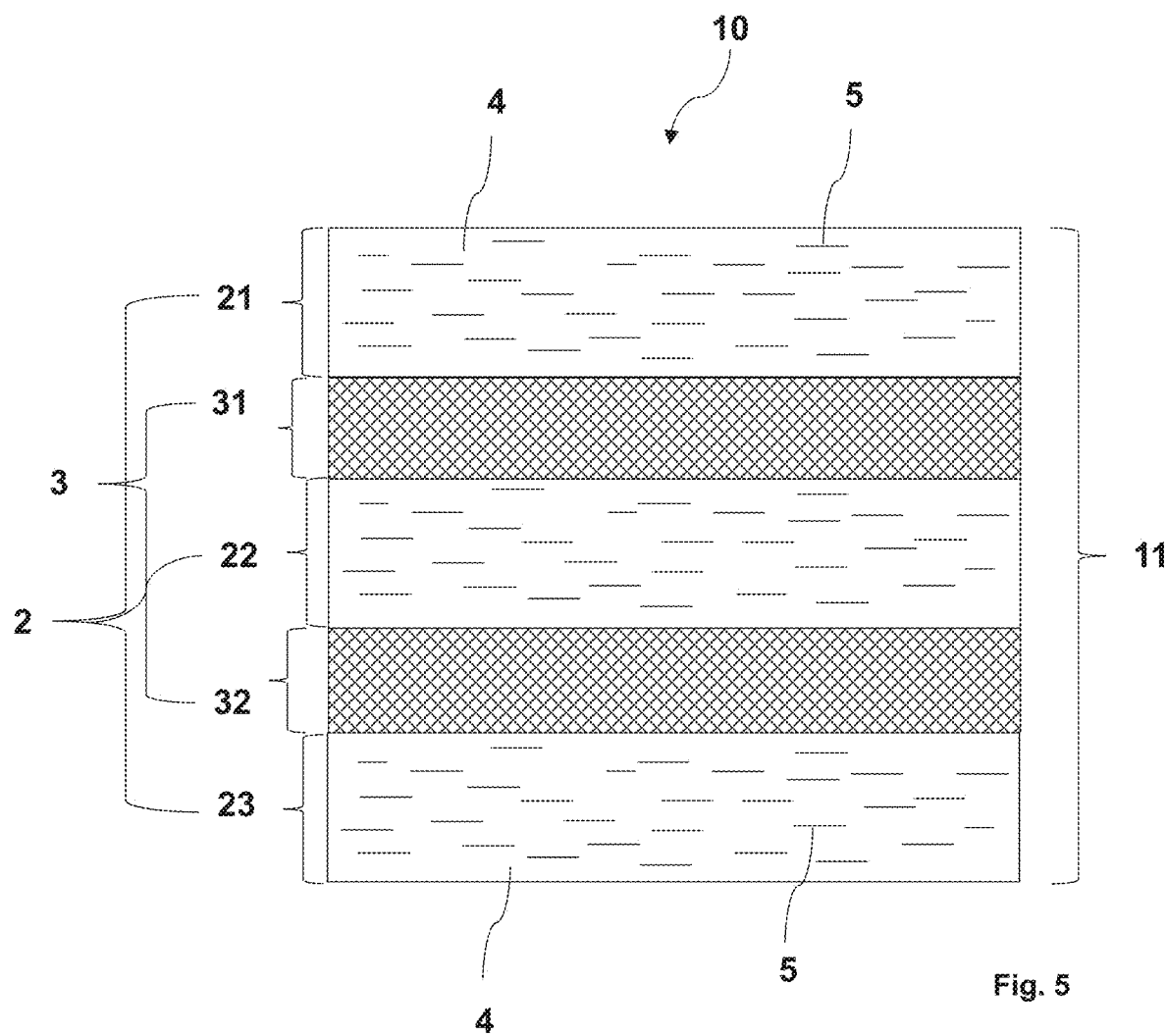
FIG. 5 shows a cross section of a fire protection element according to the invention comprising three fire protection layers and two functional layers.
Figure 6:
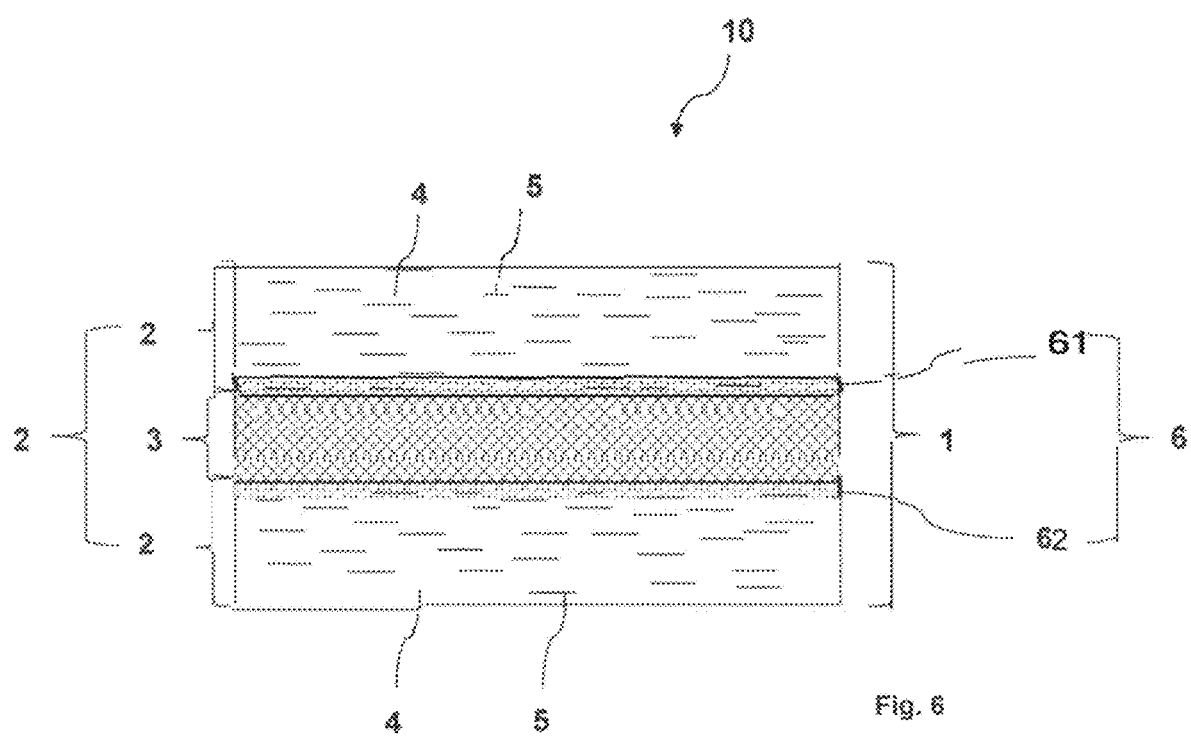
FIG. 6 shows a cross section of a preferred embodiment of a fire protection element according to the invention comprising additional intermediate layers arranged in the fire protection layers.
Figure 7:
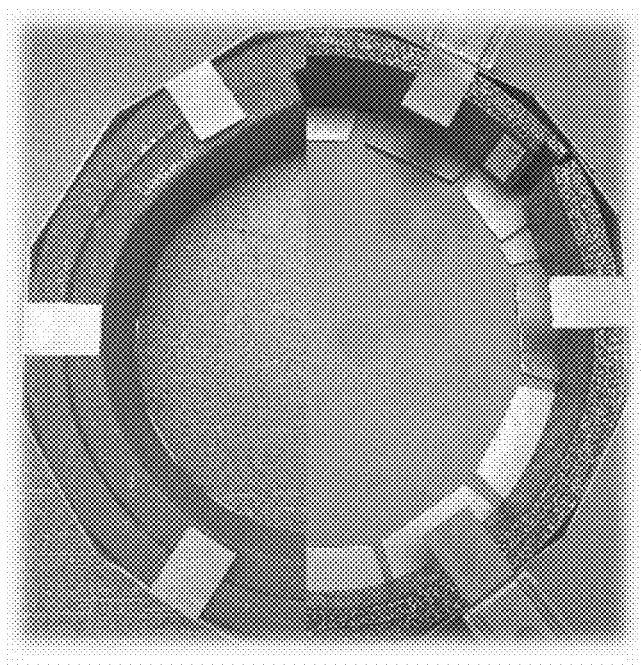
FIG. 7 shows a photograph of a comparison of a fire protection element known from the prior art (left) and a fire protection element according to the invention (right).
Figure 8:
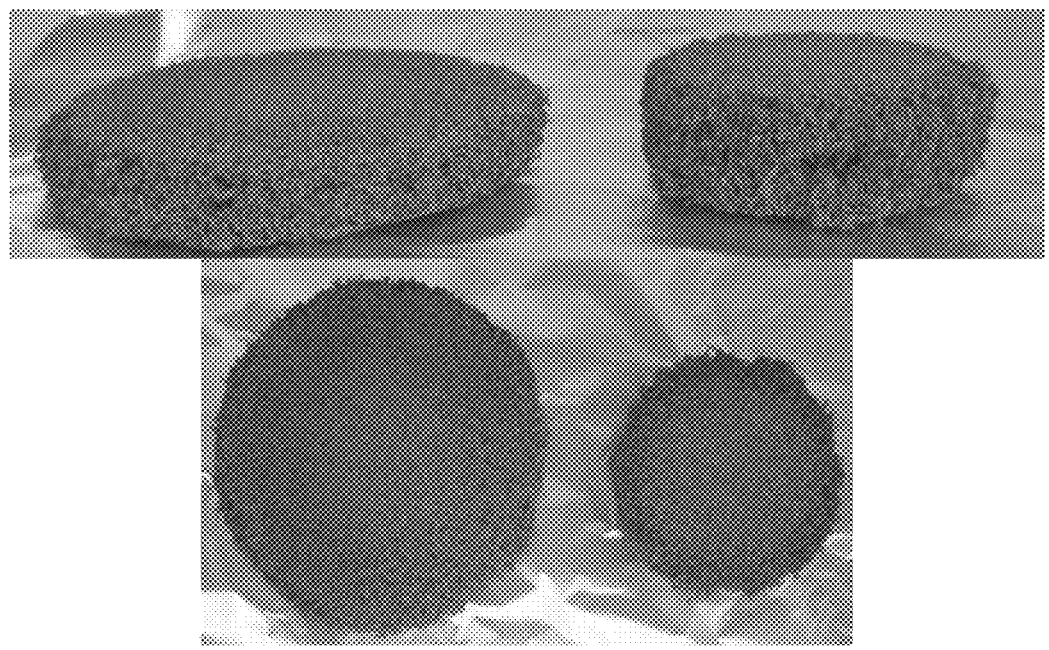
FIG. 8 shows a photograph of a comparison of a three-layer, expanded layered body from the prior art, and a three-layer, expanded layered body according to the present invention.

FIG. 1 shows a cross section of a preferred embodiment of a fire protection element according to the invention;

FIG. 2 schematically shows a three-dimensional representation of a fire protection layer (2) from FIG. 1;

FIG. 3 shows a cross section of an alternatively preferred embodiment of a fire protection element according to the invention;

FIGS. 4A, 4B, and 4C show preferred embodiments of a fire protection element according to the invention with a three-layer structure;

FIG. 5 shows a cross section of a fire protection element according to the invention comprising three fire protection layers and two functional layers;

FIG. 6 shows a cross section of a preferred embodiment of a fire protection element according to the invention comprising additional intermediate layers arranged in the fire protection layers;

FIG. 7 is a photograph of a comparison of a fire protection element known from the prior art (left) and a fire protection element according to the invention (right);

FIG. 8 is a photograph of a comparison of a three-layer, expanded layered body from the prior art, and a three-layer, expanded layered body according to the present invention.

FIG. 1 shows a cross section of an embodiment of a fire protection element (10) according to the invention comprising a two-layer layered body (11). The layered body (11) comprises a fire protection layer (2) and a functional layer (3). To form the layered body (11), the fire protection layer (2) and the functional layer (3) are firmly bonded to one another. The fire protection layer (2) comprises a carrier material (4) and a layered, physically acting blowing agent (5), wherein the layered, physically acting blowing agent (5) is embedded within the carrier material and is distributed substantially uniformly within the carrier material. Adjacent particles of the layered, physically acting blowing agent (5) are arranged substantially in parallel with one another.

FIG. 2 shows a three-dimensional representation of a fire protection layer (2) according to FIG. 1. The particles of the layered, physical blowing agent (5) are shown in the form of flat cuboids. Adjacent particles of the layered, physical blowing agent (5) are arranged in parallel with one another over the entire fire protection layer (2). FIG. 2 shows a preferred embodiment in which all the adjacent particles of the layered, physical blowing agent (5) are arranged in parallel with one another over the entire fire protection layer (2).

FIG. 3 shows a cross section of an alternative embodiment of a fire protection element (10) according to the invention comprising a two-layer layered body (11). In comparison with the view in FIG. 1, the layered, physically acting blowing agent (5) is applied to the area of the surface of the carrier material (4) that faces the functional layer (3).

FIGS. 4A, 4B, and 4C show alternative embodiments of a preferred fire protection element comprising a layered body (11) with a three-layer structure. The layered body (11) comprises the two fire protection layers (21) and (22). A functional layer (3) is arranged between the two fire protection layers (21) and (22) and is substantially firmly bonded to the fire protection layer (21) and the fire protection layer (22) in order to form the layered body (11). The fire protection layers each comprise a carrier material (4) and a layered, physically acting blowing agent (5). In FIG. 4A, in both fire protection layers (21) and (22) the layered, physically acting blowing agent (5) is embedded within the carrier material (4) and is distributed substantially uniformly within the carrier material (4). In FIG. 4B, in the fire protection layer (22) the layered, physically acting blowing agent (5) is embedded within the carrier material (4) and distributed substantially uniformly within the carrier material (4). In the fire protection layer (21), the layered, physically acting blowing agent (5) is applied to the area of the surface of the carrier material (4) that faces the functional layer (3). In FIG. 4C, in both fire protection layers (21) and (22), the layered, physically acting blowing agent (5) is applied to the area of the surface of the carrier material (4) that faces the functional layer (3).

FIG. 5 shows a cross section of a fire protection element (10) preferred according to the invention comprising a layered body (11) having three fire protection layers (21), (22) and (23) and two functional layers (31) and (32). The functional layer (31) is arranged between the fire protection layers (21) and (22) and the functional layer (32) is arranged between the fire protection layers (22) and (23), with the fire protection layers (2) and functional layers (3) that are adjacent to one another being substantially firmly bonded to one another. The fire protection layers (21), (22) and (23) comprise a carrier material (4) and a layered, physically acting blowing agent (5), wherein the layered, physically acting blowing agent (5) is embedded within the carrier material (4) and is distributed substantially uniformly within the carrier material (4). Adjacent particles of the layered, physically acting blowing agent (5) are arranged substantially in parallel with one another.

FIG. 6 shows a cross section of a preferred embodiment of a fire protection element (10) according to the invention with a layered body (11) comprising the two fire protection layers (21) and (22). A functional layer (3) is arranged between the two fire protection layers (21) and (22). The fire protection layers (21) and (22) additionally each comprise an intermediate layer (61) and (62), for example in the form of an adhesive layer, for establishing a substantially firm bond and/or form-fitting connection between the fire protection layers (2) and the functional layer (3) that are adjacent to one another.

FIG. 7 is a photograph of a comparison of a fire protection element known from the prior art (left) and a fire protection element according to the invention (right). Even the visual comparison shows that fire protection elements according to the present invention manage with much thinner fire protection layers than fire protection elements from the prior art.

FIG. 8 is a photograph of a comparison of a three-layer, expanded layered body from the prior art (left), and a three-layer, expanded layered body (right) according to the present invention following an expansion measurement.

The invention is not limited to the embodiments shown. In particular, individual features of one embodiment can be contained independently of the other features of the corresponding embodiment in a further embodiment according to the invention, i.e. the features described can be combined with one another as desired.

According to a second aspect of the present invention, a method for producing the fire protection element according to the invention is provided. The method according to the invention comprises the following steps:
 i) Providing a fire protection layer (2),
 ii) Providing a functional layer (3),
 iii) Connecting the fire protection layer (2) to the functional layer (3),
 iv) Establishing a substantially firm bond between the fire protection layer (2) and the functional layer (3).

The statements made above with respect to the fire protection element according to the invention apply equally to the method according to the invention, where applicable.

A substantially firm bond between the fire protection layer and the functional layer is preferably established by applying pressure, for example by compression. Alternatively, the substantially firm bond between the fire protection layer and the functional layer can be established by the use of an intermediate layer, for example in the form of an adhesive layer.

To produce a fire protection element which has more than one fire protection layer and/or more than one functional layer, for example two fire protection layers and one functional layer, the steps of the method according to the invention can be repeated several times.

The present invention also relates to the use of a fire protection element according to the invention for sealing passage openings and/or joints in components against fire and flue gases.

The invention is further illustrated by the following examples:

EXAMPLES

Formulations 1 and 2 were prepared with the constituents specified in Table 1, and the indicated constituents were mixed together. The prepared formulations comprise a carrier material as well as a physically acting blowing agent and can be used as a starting material for the production of the fire protection layers. The corresponding constituents are specified in the table below.

TABLE 1

Constituents of the starting material for producing the fire protection layers

| | 1 [Wt. %] | 2 [Wt. %] |
|---|---|---|
| Aqueous acrylate dispersion (65% acrylate and 35% water) | 29.00 | 42.0 |
| Expandable graphite (Kaisersberg) | 6.00 | 44.0 |
| Ammonia (ammonium hydroxide, 25% in water) | 1.26 | 0.1 |
| Short cut glass fiber (diameter ~ 10 µm, length 6 mm) | 1.10 | 5.2 |
| Ammonium polyphosphate | 10.0 | 8.7 |
| Emulsifier | 0.20 | — |
| Dispersant | 0.50 | — |
| Plasticizer (Indopol) | 5.50 | — |
| Monopropylene glycol | 1.00 | — |
| Fungicide | 0.30 | — |
| Thickener | 0.14 | — |
| Water | 8.40 | — |
| Kaolin (Capsil 2004) | 25.60 | — |
| Foam glass beads (Porayer 40~125 µm) | 10.00 | — |
| Iron oxide | 1.00 | — |

To produce the fire protection layers for use in the fire protection element according to the invention, a defined amount of the relevant formulation was applied to a PE film having a smooth surface and the starting material was then covered on both sides by folding the PE film. In the first step, the starting material covered with PE film was calendered to a layer thickness of 6 mm (distance between the rollers in the calender between 0.5 mm and 10.0 mm). The distance between the rollers of the calender was reduced in steps of approximately 1 mm and the aforementioned steps were repeated until the mass had the desired layer thickness (3.5 mm in the described embodiments). To smooth the surface, the last processing step was carried out twice with the calender. Alternatively, this step was performed by applying pressure via a roller. The composite materials thus produced exhibit a substantially parallel alignment of the layered, physically acting blowing agent within the carrier material, which was determined by means of visual inspection under a microscope.

The fire protection layers produced in this way were used to produce fire protection elements according to the invention. For this purpose, in each case a functional layer was arranged between two fire protection layers, and each fire protection layer was substantially firmly bonded to the adjacent functional layer by pressing. If substantially firm bonds could not be obtained by pressing, a small amount of the aqueous acrylate dispersion was additionally applied between the layers in order to obtain a substantially firm bond.

To determine the expansion properties of the fire protection elements, a device for function replacement testing was used to determine the height of the expansion (upward direction of the expansion). To compare the different fire protection elements, the so-called expansion factor was determined from these measurements, which represents the quotients of the expansion height of the relevant fire protection element with respect to the total weight of all fire protection layers of the fire protection element. The measuring device for performing the function replacement test consisted of two horizontally arranged heatable plates. The top plate had a constant weight. Fire protection elements to be measured (circular, diameter 45 mm) were arranged between the heatable plates and subjected to a temperature program (starting temperature 50° C., heating rate 20° C./min, intermediate temperature 100° C. (5 min), heating rate 20° C., final temperature 500° C. (15 min hold time). The top plate was able to record the expansion of the fire protection elements in height.

FIG. 8 is a photograph of a comparison of a three-layer, expanded layered body from the prior art (left), and a three-layer, expanded layered body (right) according to the present invention after measuring the expansion properties. It was found that, in the fire protection element according to the invention, the expansion took placed predominantly in height (perpendicularly to the particles of layered, physically acting blowing agent), whereas, in the fire protection element from the prior art, the expansion in height was much less pronounced and took place in the longitudinal direction instead.

Various semi-rigid materials were used as the functional layer for the production of fire protection elements according to the invention. Fire protection elements having a three-layer structure consisting of two fire protection layers and a functional layer arranged between the fire protection layers were produced. The semi-rigid material of the functional layer is specified in Table 2 and 3.

To compare different functional layers, the relative performance of fire protection elements was determined, which is defined as the quotient of the expansion factor of a fire protection element with an intermediate layer and the expansion factor of a reference sample without an intermediate layer. The expansion factor is calculated on the basis of a reference line, which was established in advance by measuring the expansion behavior with samples of different thicknesses. All fire protection elements having a relative performance of greater than 1 show improved performance and are in accordance with the invention. The determined reference lines for the two formulations 1 and 2 are specified in the text accompanying Tables 2 and 3.

TABLE 2

| Functional layer (all dimensions in mm) | Relative performance |
|---|---|
| Standard without intermediate layer | 1.00 |
| Glass fiber woven fabric (body, weight per unit area 660 g/m²; thickness 0.8 mm; thread count warp/weft 15.5/16; maximum tensile force warp/weft >2200/ > 3200 N/5 cm according to ISO 4606) | 1.74 |
| Expanded metal (aluminum 99.5 hh, web width 0.6, web thickness 0.5, mesh size 4.0, mesh height 2.4, total thickness 0.9) | 1.71 |
| Expanded metal (aluminum 99.5 hh, web width 1.5, web thickness 0.8, mesh size 10.0, mesh height 5.0, total thickness 1.7) | 1.58 |

Relative performance of different functional layers, fire protection layers according to formulation 1.
The expansion factor y was calculated from the reference line $y = 8.23 \cdot x^{-1.46}$ (x = weight of the sample), which was determined using fire protection layers of different thicknesses (diameter 4.5 cm; approx. 5.0 to 17.0 g; $R^2 = 0.98$)

TABLE 3

| Functional layer (all dimensions in mm) | Relative performance |
|---|---|
| Standard without intermediate layer | 1.00 |
| Glass fiber woven fabric (body, weight per unit area 660 g/m²; thickness 0.8 mm; thread count warp/weft 15.5/16; maximum tensile force warp/weft > 2200/ > 3200 N/5 cm according to ISO 4606) | 1.75 |
| Expanded metal (aluminum 99.5 hh, web width 0.6, web thickness 0.5, mesh size 4.0, mesh height 2.4, tota lthickness 0.9) | 1.50 |
| Expanded metal (aluminum 99.5 hh, web width 1.5, web thickness 0.8, mesh size 10.0, mesh height 5.0, total thickness 1.7) | 1.14 |

Relative performance of different functional layers, fire protection layers according to formulation 2.
The expansion factor y was calculated from the reference line $y = 16.66 \cdot x^{-1.52}$ (x = weight of the sample), which was determined using fire protection layers of different thicknesses (diameter 4.5 cm; approx. 7.0 to 18.0 g; $R^2 = 0.95$)

Fire protection elements were produced having the specifications listed in the following table. These fire protection elements were tested in a 120 min F&T rating fire test with different pipe types. The percentages refer to the comparison with a HILTI CP-644 fire protection sleeve.

TABLE 4

Overview of material savings in fire protection elements according to the invention

| Functional Pipe type [mm] | Number of functional layers | Mass fire protection element according to the prior art | E-glass woven fabric | Aluminum expanded metal |
|---|---|---|---|---|
| | | | Material savings with fire protection elements according to the invention | |
| 32 × 1.9 PVC | 1 | 32 g | −25% | −34% |
| 32 × 1.8 PVC | 1 | | −25% | −34% |
| 110 × 2.2 PVC | 2 | 330 g | −44% | −55% |
| 110 × 5.3 PVC | 2 | | −44% | −55% |
| 110 × 8.1 PVC | 2 | | | −58% |
| 110 × 2.7 RehauRauPiano | 2 | | −46% | −58% |
| 110 × 5.3 Wavin AS | 2 | | — | −56% |
| 160 × 3.2 PVC | 2 × 3 | 2 fire protection elements total: | −53% | −60% |
| 160 × 4.3 RehauRauPiano | 2 × 3 | | — | −58% |

A visual comparison of the material savings in a fire protection element according to the invention is shown in FIG. 6.

The invention claimed is:
1. A fire protection element, comprising:
at least one fire protection layer; and
at least one functional layer,
wherein the at least one fire protection layer comprises a carrier material and a number of particles of at least one layered, physically acting blowing agent,
the at least one functional layer has a temperature resistance up to at least 300° C.,
the at least one fire protection layer and the at least one functional layer are at least planarly firmly bonded to one another and wherein adjacent particles of the at least one layered, physically acting blowing agent are arranged substantially in parallel with one another over an entirety of the at least one fire protection layer, the at least one functional layer comprises at least one semi-rigid material, and said at least one functional layer is placed and/or pressed into a not-yet dried carrier material of said at least one fire protection layer and then said carrier material is cured by physical drying.

2. The fire protection element according to claim 1, wherein the at least one layered, physically acting blowing agent is selected from a group consisting of graphite intercalation compounds, phyllosilicate intercalation compounds, and mixtures thereof.

3. The fire protection element according to claim 1, wherein the at least one layered, physically acting blowing agent is embedded into the carrier material.

4. The fire protection element according to claim 1, wherein the at least one layered, physically acting blowing agent is applied on one or more areas of a surface of the carrier material.

5. The fire protection element according to claim 1, wherein the carrier material has a softening or decomposition point in the range of from 80° C. to 500° C.

6. The fire protection element according to claim 1, wherein the at least one semi-rigid material is selected from a group consisting of fiber composite material, metal, metal alloys, and combinations thereof.

7. The fire protection element according to claim 1, wherein the at least one semi-rigid material is formed as a film, as a perforated plate, as a mat, as a grid, or as a woven fabric.

8. The fire protection element according to claim 7, wherein the at least one semi-rigid material is selected from a group consisting of expanded metal, glass fiber woven fabric, aluminum foil, and combinations thereof.

9. The fire protection element according to claim 1, formed as a layered body comprising at least two fire protection layers and at least one functional layer arranged between the at least two fire protection layers.

10. The fire protection element according to claim 9, wherein the at least two fire protection layers and the at least one functional layer arranged between the at least two fire protection layers are at least planarly firmly bonded to one another.

11. The fire protection element according to claim 1, wherein one or more fire protection layers of the at least one fire protection layer and/or the at least one functional layer additionally comprise one or more intermediate layers.

12. The fire protection element according to claim 1, wherein the at least one fire protection layer has a maximum average layer thickness of ≤10 mm.

13. The fire protection element according to claim 9, wherein the layered body is strip-shaped.

14. A method for producing a fire protection element according to claim 1, the method comprising:
  i) providing a fire protection layer,
  ii) providing a functional layer,
  iii) connecting the fire protection layer to the functional layer, and
  iv) establishing an at least planar firm bond between the fire protection layer and the functional layer.

15. A method for sealing passage openings and/or joints in components with a fire protection element against fire and flue gases, the method comprising:
  expanding the fire protection element according to claim 1 to the passage openings and/or joints in components.

16. The fire protection element according to claim 4, wherein the at least one layered, physically acting blowing agent is applied to an area on the surface of the carrier material that faces the at least one functional layer.

* * * * *